United States Patent

Wernberg

[11] 3,918,254
[45] Nov. 11, 1975

[54] FUEL CONTROL FOR A GAS TURBINE HAVING AUXILIARY AIR BLEED

[75] Inventor: Donald E. Wernberg, Rockford, Ill.

[73] Assignee: Woodward Governor Company, Rockford, Ill.

[22] Filed: May 16, 1974

[21] Appl. No.: 470,582

[52] U.S. Cl. .................. 60/39.28 R; 73/407 PR
[51] Int. Cl.² .................................. F02C 9/08
[58] Field of Search ..... 60/39.28 R, 39.27, 39.28 T; 415/27, 28, 29; 73/407 PR

[56] References Cited
UNITED STATES PATENTS

| 2,836,035 | 5/1958 | Chappell | 60/39.27 |
| 3,006,145 | 10/1961 | Sobey | 60/39.27 X |
| 3,212,260 | 10/1965 | Gardner | 60/39.28 R |
| 3,267,669 | 8/1966 | Tissier | 60/39.28 R |
| 3,363,414 | 1/1968 | Johnson | 60/39.28 R |
| 3,508,396 | 4/1970 | Ifield | 60/39.28 R |
| 3,780,528 | 12/1973 | Brandeburg | 60/39.27 |

Primary Examiner—Clarence R. Gordon
Attorney, Agent, or Firm—Wolfe, Hubbard, Leydig, Voit & Osann, Ltd.

[57] ABSTRACT

A fuel control for a gas turbine in which the compressor discharge pressure sensor also detects the pressure of air bled from the turbine and increases the rate of fuel flow as a linear function of decreases in the ratio of bleed pressure to compressor discharge pressure.

9 Claims, 5 Drawing Figures

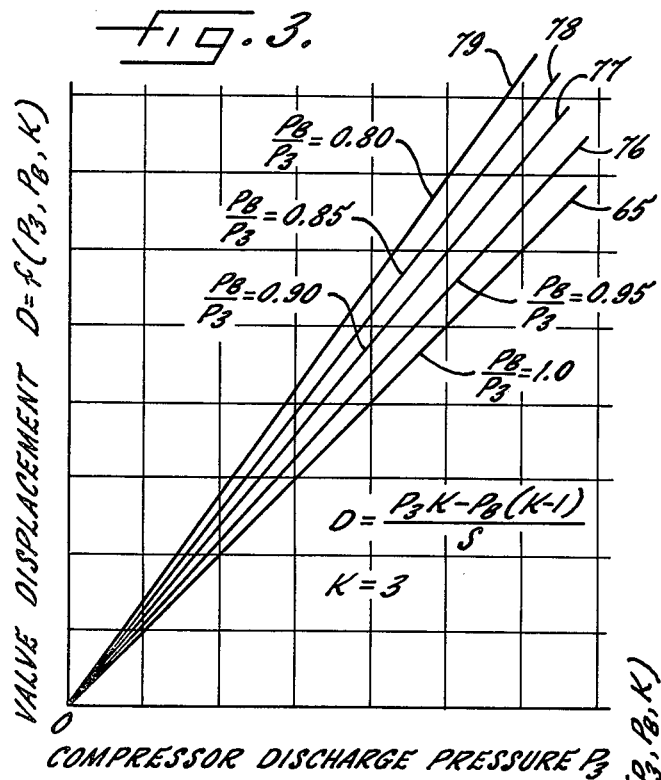
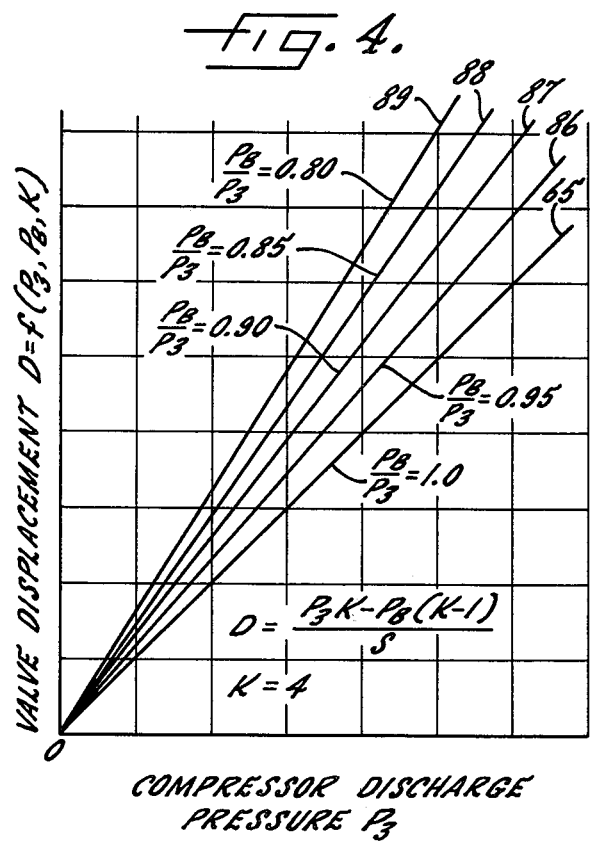
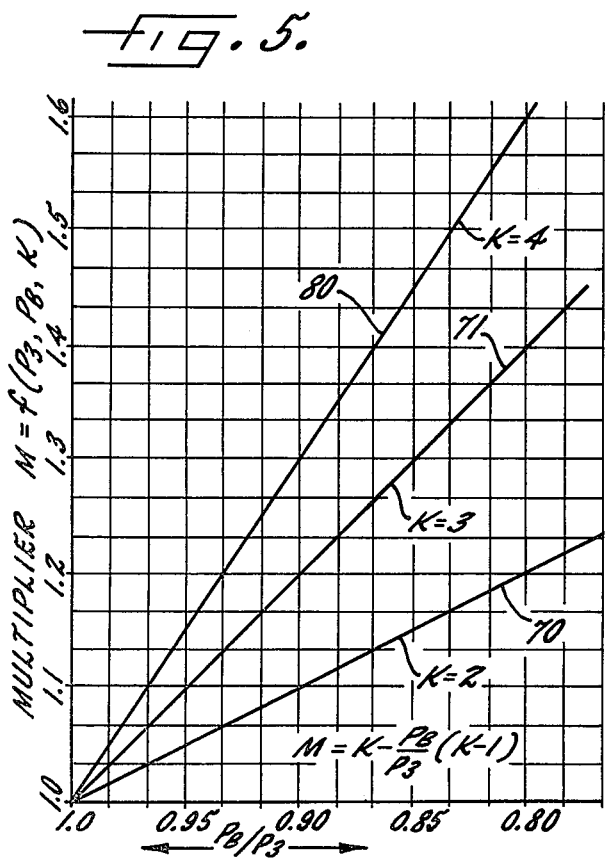

FUEL CONTROL FOR A GAS TURBINE HAVING AUXILIARY AIR BLEED

BACKGROUND OF THE INVENTION

This invention relates to a fuel control for a prime mover and particularly to a control for regulating the rate of fuel flow to the burners of a gas turbine having a rotary compressor whose discharge pressure is detected and is used in establishing the flow rate at various times such as when the prime mover is accelerating. Usually, such a control includes a sensor which detects the compressor discharge pressure and causes the position of a fuel regulating element to change as a function of changes in the compressor discharge pressure. A control of this general type is disclosed in Leeson U.S. Pat. No. 3,142,154 in which the compressor discharge pressure sensor and the fuel regulating element actuated thereby are indicated by the reference numerals 127 and 198, respectively.

More specifically, the invention relates to a fuel control for a turbine of the type in which air is bled from the compressor discharge and is used to perform auxiliary functions or to operate auxiliary equipment. When the compressor discharge pressure is at a given value and the bleed flow increases, it is desirable to move the fuel regulating element to a position enriching the fuel flow to the burners in order to keep the prime mover operating at substantially the same capacity in spite of the increased bleed flow. The position of the fuel regulating element, therefore, should be changed not only as a function of compressor discharge pressure but also as a function of bleed flow.

One method of measuring the bleed flow is to measure the pressure of the air in the bleed passage which communicates with the compressor discharge. Thus, as the bleed flow increases, the bleed pressure decreases. If there is no bleed flow, the bleed pressure is substantially equal to the compressor discharge pressure and, under this condition, the position of the fuel regulating element is changed in accordance with what may be called a "standard schedule" which varies as a predetermined function of changes in compressor discharge pressure.

In order to effect enrichment of the fuel as a function of bleed flow when bleed flow increases, it has been proposed to modify the standard schedule as a non-linear function of changes in the ratio of bleed pressure to compressor discharge pressure. Such a proposal, however, requires the use of relatively complex ratioing mechanisms, three dimensional cams or the like to achieve the desired non-linear modification to the standard schedule.

SUMMARY OF THE INVENTION

The general aim of the present invention is to provide a new and improved fuel control which acceptably modifies the standard schedule to provide for fuel enrichment as bleed flow increases and which requires far less elaborate equipment than would be the case with the prior proposal discussed above.

A more detailed object is to achieve the foregoing by providing a fuel control having a unique compressor discharge pressure sensor which also detects bleed pressure and modifies the standard schedule so as to increase fuel flow as a linear function of decreases in the ratio of bleed pressure to compressor discharge pressure.

A further object is to enable modification of the standard schedule as different linear functions of changes in the ratio of bleed pressure to compressor discharge pressure simply by changing the relative size of the elements of the novel compressor discharge sensor.

In a structural sense, the invention resides in modifying a standard compressor discharge pressure sensor such that the sensor also detects bleed pressure and moves the fuel regulating element in accordance with the weighted difference between the compressor discharge pressure and the bleed pressure.

These and other objects and advantages of the invention will become more apparent from the following detailed description when taken in conjunction with the accompanying drawings.

BRIEF DESCRIPTION OF THE DRAWINGS

FIGS. 3 and 4 are families of curves similar to the curves of FIG. 2 but illustrating the displacement of the fuel regulating element when the fuel control is equipped with different compressor discharge pressure sensors.

FIG. 5 is a family of curves which show, for three different compressor discharge pressure sensors, the corrective factors which are applied to the displacement of the fuel regulating element when there is a change in the ratio of bleed pressure to compressor discharge pressure.

DETAILED DESCRIPTION OF THE PREFERRED EMBODIMENT

Figure 1:
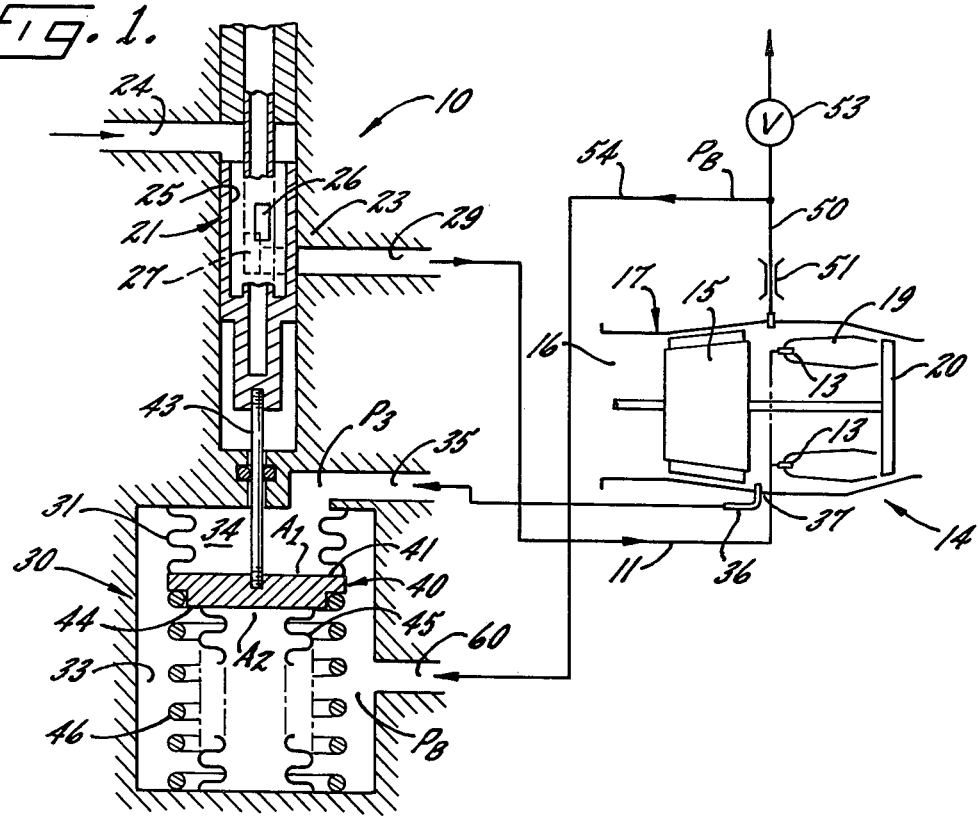
FIG. 1 is a schematic illustration of an exemplary gas turbine equipped with a new and improved fuel control embodying the novel features of the present invention.

In the drawings, the improved fuel control 10 of the present invention is shown as especially adapted for use in regulating the flow rate of liquid fuel under pressure to a line 11 leading to the burner nozzles 13 of a gas turbine 14 driving the usual rotary compressor 15. Air entering the inlet 16 of an elongated housing 17 passes successively through the rotor of the compressor 15, a combustion chamber 19, and the blades of a turbine 20 before being discharged from the outlet of the housing.

The fuel control 10 comprises a fuel regulating element 21 which herein takes the form of a fuel metering valve adapted to be displaced both axially and rotatably within a casing 23. Fuel under pressure flows into the casing through an inlet passage 24, flows into a chamber 25 defined within the valve 21, and then flows out of a generally rectangular port 26 formed in the wall of the chamber. The port 26 is adapted to register with a similarly shaped port 27 formed in the casing 23 and communicating with an outlet passage 29 connected to the line 11 leading to the burner nozzles 13. As the valve 21 is displaced downwardly from the position shown in FIG. 1, a progressively greater area of the port 26 registers with the port 27 to increase the rate of flow into the outlet passage 29. Similarly, rotation of the valve in a direction to move the port 26 to the left from the position shown in FIG. 1 causes a greater area of the port to register with the port 27 to increase the flow rate. Rotation of the valve is effected by mechanism which does not pertain to the present invention and thus such mechanism has not been shown.

Axial displacement of the valve 21 is effected in response to changes in the pressure of the air discharged from the outlet of the compressor 15 as measured by a compressor discharge pressure sensor 30, the compressor discharge pressure conventionally being designated by the symbol $P_3$. The sensor comprises a sealed bellows 31 which is located within a chamber 33 in the casing 23 and whose interior or chamber 34 communicates via a passage 35 with a tube 36 terminating within the compressor discharge section 37 of the turbine housing 17. Accordingly, the interior of the bellows is exposed to compressor discharge pressure $P_3$.

At its lower end, the bellows 31 is sealed to a piston 40 whose upper side 41 defines the lower wall of the bellows chamber 34, the piston being connected by a rod 43 to the fuel valve 21. Sealed to the lower side or wall 44 of the piston is an evacuated bellows 45 which is of smaller cross-sectional area than the bellows 31 and which establishes an absolute pressure reference. A coil spring 46 is telescoped over the bellows 45 and is compressed between the lower wall of the casing 23 and the lower side 44 of the piston 40 so as to urge the latter upwardly.

With the foregoing arrangement, an increase in compressor discharge pressure $P_3$ results in the piston 40 being forced downwardly to effect downward displacement of the valve 21 and thereby increase the rate of fuel flow into the passage 29. When $P_3$ decreases, the spring 46 forces the piston 40 and the valve 21 upwardly to reduce the flow rate. Displacement of the valve thus varies as a function of $P_3$.

With the present turbine 14, a variable amount of pressurized air is bled from the discharge of the compressor 15 and is used to operate auxiliary equipment or to perform auxiliary functions. For this purpose, a bleed passage 50 having a restriction 51 communicates with the compressor discharge sections 37 and includes a valve 53 which may be moved from a fully closed position to various open positions to control the flow rate of bleed air from the compressor discharge section. Because of the restriction 51, the flow rate of the bleed air may be measured by detecting the bleed pressure $P_B$ in a closed line 54 which communicates with the bleed passage 50 at a point located between the restriction and the bleed valve 53. When the bleed valve 53 is fully closed and there is no bleed flow, the bleed pressure $P_B$ is equal to compressor discharge pressure $P_3$. When the bleed valve 53 is fully open, $P_B$ in this particular instance is reduced to approximately 80 percent $P_3$.

When air is bled from the compressor discharge section 37 through the bleed passage 50, the capacity of the turbine 14 tends to be reduced. To avoid reducing the capacity of the turbine when bleed occurs, it is desirable to increase the rate of fuel flow to the turbine as the bleed flow increases and the bleed pressure $P_B$ decreases.

The present invention is based on my discovery that the rate of fuel flow can be increased according to acceptable schedules as the bleed flow increases by displacing the fuel regulating element or valve 21 as a function of the weighted difference between compressor discharge pressure $P_3$ and bleed pressure $P_B$. I have further discovered that such schedules can be achieved in an extremely simple manner and without need of complex equipment by constructing the compressor discharge pressure sensor 30 to detect and measure the bleed pressure $P_B$ as well as the compressor discharge pressure $P_3$ and by using the sensor to displace the fuel regulating element 21 as a function of both pressures.

More specifically, the invention is carried out in its exemplary form by exposing the chamber 33 and the uncovered surface of the piston 40 to the pressure $P_B$ of the air in the bleed passage 50. For this purpose, the line 54 which communicates with the bleed passage 50 leads to the sensor 30 and communicates with the chamber 33 by way of a passage 60 in the casing 23. Thus, the bleed pressure exerts an upward force on the uncovered portion of the lower side or wall 44 of the piston 40 and tends to displace the fuel valve 21 upwardly. If the bleed pressure $P_B$ decreases with respect to compressor discharge pressure $P_3$ as a result of an increase in bleed flow, the upward force acting on the piston is reduced so that the fuel valve 21 is displaced downwardly to increase the fuel flow. Conversely, a reduction in bleed flow causes an increase in bleed pressure $P_B$ with respect to compressor discharge pressure $P_3$ so as to displace the fuel valve upwardly and reduce the fuel flow.

The fuel valve 21 will remain in an axially fixed position when the downward force exerted on the piston 40 by the compressor discharge pressure $P_3$ is balanced by the combined upward forces exerted on the piston by the bleed pressure $P_B$ and the spring 46. The downward force exerted by the compressor discharge pressure is equal to the value of $P_3$ multiplied by the effective piston area $A_1$ against which the pressure $P_3$ acts, such area in this instance being equal to the effective cross-sectional area of the bellows 31. The upward force exerted by the bleed pressure is equal to the value of $P_3$ multiplied by the effective piston area against which the bleed pressure acts. Herein, the latter area is equal to $A_1-A_2$ where $A_2$ is the effective cross-sectional area of the bellows 45. Accordingly, the forces on the valve 21 are balanced and the valve is stationary when:

$$F_S = P_3 A_1 \quad P_B(A_1 \quad A_2) \qquad (1)$$

where $F_S$ equals the force exerted by the spring.

To best gain an understanding of the effect of the sensor 30 on the flow rate of the fuel, it should be assumed that the flow rate varies as a linear function of changes in the axial displacement D of the fuel valve 21 from a given reference point and that such axial displacement varies as a linear function of the force applied to the valve. When the spring rate is equal to $S$, the axial displacement D of the valve as a function of the variables $P_3$ and $P_B$ may be expressed as follows:

$$D = \frac{P_3 A_1 \quad P_B(A_1 \quad A_2)}{S} \qquad (2)$$

And, by letting $A_2 = 1$ and letting $A_1 = KA_2$, where $K$ is a constant, equation (2) may be rewritten as:

$$D = \frac{P_3 K \quad P_B(K \quad 1)}{S} \qquad (3)$$

From equation (3), it will be seen that the sensor 30 causes displacement D of the valve 21 to change as a predetermined linear function of the "weighted" difference between the pressures $P_3$ and $P_B$, the term weighted meaning that either $P_3$, $P_B$ or both is multiplied by a constant factor which, in the present control 10, is determined by the ratio of the areas $A_1$ and $A_2$ of the bellows 31 and 45.

Now, by assuming that the area $A_1$ of bellows 31 is twice the area $A_2$ of bellows 45 so that K equals two, equation (3) may be written as:

$$D = \frac{2P_3 - P_B}{S} \quad (4)$$

And, when there is no bleed flow, $P_B$ is equal to $P_3$ and thus equation (4) may be written as:

$$D = \frac{P_3}{S} \quad (5)$$

Accordingly, it will be seen that displacement D of the valve 21 follows a schedule which varies as a function of changes in the compressor discharge pressure $P_3$ when that pressure and the bleed pressure are equal (i.e., when $(P_B/P_3) = 1$). That schedule, hereinafter called the "standard schedule", is shown by the curve 65 in FIG. 2.

Now, when the bleed valve 53 is opened and $P_B$ decreases with respect to $P_3$, changes in $P_3$ will cause displacement D of the fuel valve 21 according to different schedules which differ from one another and from the standard schedule 65 as a linear function of $P_B/P_3$. Those different schedules (where $K = 2$) for values of $P_B/P_3$ of 0.95, 0.90, 0.85 and 0.80 are indicated by the curves 66, 67, 68 and 69, respectively, in FIG. 2.

To explain the derivation of the schedules 66 to 69, it is helpful to rewrite equation (3) in the following terms:

$$D = \frac{P_3}{S}\left[K - \frac{P_B}{P_3}(K-1)\right] \quad (6)$$

From equation (6), it will be seen that the $P_3$ signal normally applied to the sensor 30 by way of the passage 35 is multiplied by the factor in brackets and that this factor, hereinafter called the multiplier M, varies as a linear function of $P_B/P_3$. The curve 70 in FIG. 5 shows the variation of the multiplier M with respect to changes in $P_B/P_3$ when K is equal to two. When $P_B/P_3$ is equal to one, the multiplier M applied to the $P_3$ signal also is equal to one and thus the fuel valve 21 is displaced in accordance with the standard schedule 65 (FIG. 2) as $P_3$ changes. When bleed occurs and the value of $P_B/P_3$ decreases below one, the value of the multiplier M applied to the $P_3$ signal increases linearly according to the curve 70 (FIG. 5) so that changes in $P_3$ cause displacement of the valve 21 according to different schedules as exemplified by the schedules 66 to 69 shown in FIG. 2.

Figure 2:
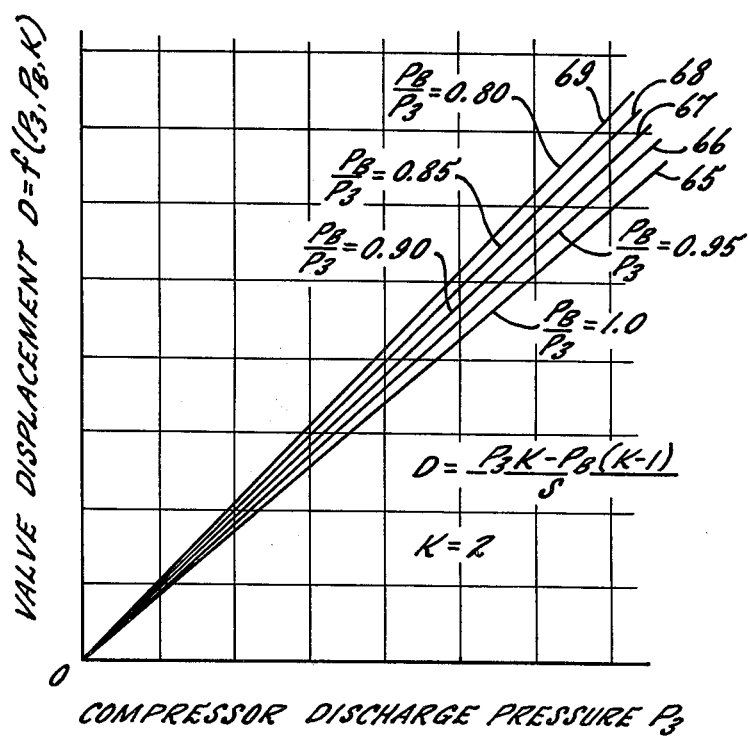
FIG. 2 is a family of curves which illustrate the displacement of the fuel regulating element with respect to compressor discharge pressure for various constant ratios of bleed pressure to compressor discharge pressure.

From the curves 65 to 69 in FIG. 2, it will be seen that if the compressor discharge pressure $P_3$ is at a given value above zero, a given change in $P_B/P_3$ will produce a constant percentage change in the displacement D of the valve 21 regardless of the value of $P_3$. For example, when K equals two, a 5 percent decrease in the value of $P_B/P_3$ will produce a 5 percent increase in the displacement D of the valve regardless of the value of $P_3$ and will increase the rate of fuel flow by 5 percent, assuming the flow rate varies linearly with the displacement D. Thus, the flow rate is increased linearly as a function of a decrease in the ratio of bleed pressure $P_B$ with respect to the compressor discharge pressure $P_3$. The fuel flow to the turbine 14 thus may be increased according to acceptable schedules when bleed flow occurs.

By changing the ratio of the areas $A_1$ and $A_2$ of the bellows 31 and 45, the constant K can be set at different values so as to cause a different percentage change in the displacement D of the valve 21, and thus in the rate of fuel flow, for a given change in the value of $P_B/P_3$. Thus, if K is given a value of three, the multiplier M varies with respect to changes in $P_B/P_3$ as shown by the curve 71 in FIG. 5 and the valve 21 is displaced according to the schedules 65 and 76 to 79 of FIG. 3. If the bellows 31 and 45 are sized to give K a value of four, the multiplier M varies with respect to changes in $P_B/P_3$ as shown by the curve 80 in FIG. 5 and the valve 21 is displaced according to the schedules 65 and 86 to 89 of FIG. 4. Thus, the sensor 30 may be adapted to conform to the fuel requirements of different turbines 14 (or different turbine manufacturers) simply by selectively sizing the areas $A_1$ and $A_2$ of the bellows 31 and 45 to establish a proper value for K. It will be noted from FIGS. 2 to 4 that the standard schedule or curve 65 is the same regardless of the value of K. With the present sensor 30, the value of K should always be above one so that the valve 21 is displaced in a direction to increase fuel flow when the value of $P_B/P_3$ decreases.

From the foregoing, it will be apparent that the present invention brings to the art a new and improved fuel control 10 in which the compressor discharge pressure sensor 30 is uniquely constructed so as to also detect bleed pressure and to cause the flow rate of the fuel to be appropriately increased in response to a decrease in the ratio of bleed pressure to compressor discharge pressure. The foregoing is achieved by making a simple modification to a standard sensor and, by merely changing the ratio of the areas of the bellows 31 and 45, the sensor can be easily adapted to meet the requirements of different turbines 14. While the sensor 30 has been specifically illustrated and described as being directly connected to a fuel regulating element in the form of a metering valve 21, those of ordinary skill in the art will appreciate that the sensor could be connected to a different type of fuel regulating element or that the sensor could have a non-mechanical output such as a pressure signal for indirectly displacing a fuel regulating element such as the element 198 disclosed in the aforementioned Leeson patent.

I claim as my invention:

1. A control for regulating the rate of fuel flow to the burners of a gas turbine having a compressor discharge section and having a valved bleed passage communicating with said compressor discharge section to deliver a variable amount of air from said compressor discharge section for auxiliary use, said control comprising a fuel regulating element displaceable to different positions to control the rate of fuel flow to said burners, and means for detecting the weighted difference between the pressure $P_3$ in said compressor discharge section and the pressure $P_B$ in said bleed passage and for causing said fuel regulating element to be displaced as a predetermined function of changes in said weighted difference.

2. A control as defined in claim 1 in which said function is linear.

3. A control as defined in claim 1 in which said means cause said displacement to vary according to changes in the relationship $P_3K - P_B(K - 1)$ where $K$ is a constant.

4. A control as defined in claim 1 in which said means comprise a first chamber communicating with said compressor discharge section, a second chamber communicating with said bleed passage, each of said chambers having a wall which is moved in response to pressure changes in the respective chambers, and means connected to said walls and operable to cause displacement of said fuel regulating element in response to movement of said walls.

5. A control as defined in claim 4 in which said walls are located so as to cause movement of said connected means in one direction in response to an increase in pressure in one of said chambers and in the opposite direction in response to an increase in pressure in the other of said chambers.

6. A control as defined in claim 5 in which said walls have different effective areas against which the respective pressures act.

7. The combination of, a gas turbine having burners, and a control having a fuel regulating element displaceable to different positions to control the rate of fuel flow to said burners, said turbine having a compressor discharge section and having a valved bleed passage communicating with said compressor discharge section to deliver a variable amount of air from said compressor discharge section for auxiliary use, the improvement in said combination comprising, means for detecting the weighted difference between the pressure $P_3$ in said compressor discharge section and the pressure $P_B$ in said bleed passage and for causing said fuel regulating element to be displaced as a predetermined function of changes in said weighted difference, said means comprising first and second chambers communicating with said compressor discharge section and said bleed passage, respectively, said first chamber having a wall which is movable in one direction in response to an increase in pressure in said compressor discharge section, said second chamber having a wall which is movable in said one direction in response to a decrease in pressure in said bleed passage, and means connected to said walls and operable to cause displacement of said fuel regulating element in response to movement of said walls.

8. The combination of, a gas turbine having burners, and a control having a fuel regulating element displaceable to different positions to control the rate of fuel flow to said burners, said turbine having a compressor discharge section and having a valved bleed passage communicating with said compressor discharge section to deliver a variable amount of air from said compressor discharge section for auxiliary use, the improvement in said combination comprising, means for sensing the pressure in said compressor discharge section and the pressure in said bleed passage and for causing displacement of said fuel regulating element in response to a change in either pressure, said means comprising first and second chambers communicating with said compressor discharge section and said bleed passage, respectively, said first chamber having a wall which is movable in one direction in response to an increase in pressure in said compressor discharge section, said second chamber having a wall which is movable in said one direction in response to a decrease in pressure in said bleed passage, and means connected to said walls and operable to cause displacement of said fuel regulating element in response to movement of said walls.

9. A control for regulating the rate of fuel flow to the burners of a gas turbine having a compressor discharge section and having a valved bleed passage communicating with said compressor discharge section to deliver a variable amount of air from said compressor discharge section for auxiliary use, said control comprising a fuel regulatingg element displaceable to different positions to control the rate of fuel flow to said burners, means for detecting the pressure $P_3$ in said compressor discharge section and the pressure $P_B$ in said bleed passage and for causing displacement D of said fuel regulating element in response to a change in either pressure, said means causing said displacement D to change as a linear function of changes in $P_B/P_3$ whereby a given change in $P_B/P_3$ will produce a constant percentage change in D regardless of the value of $P_3$.

* * * * *

Disclaimer 3,918,254.—*Donald E. Wernberg*, Rockford, Ill. FUEL CONTROL FOR A GAS TURBINE HAVING AUXILIARY AIR BLEED. Patent dated Nov. 11, 1975. Disclaimer filed Dec. 1, 1977, by the assignee, *Woodward Governor Company*.

Hereby enters this disclaimer to claim 1 of said patent.

[*Official Gazette February 14, 1978.*]